Weaver & Allen.

Rubber Spring.

N°. 92,236. Patented Jul. 6, 1869.

Witnesses:
W. B. Deming
Wm. H. Braredon Jr.

Inventor:
Weaver & Allen
by Knight Bros
Attorneys

United States Patent Office.

GEORGE WEAVER, AND H. NELSON ALLEN, OF BOSTON, MASSACHUSETTS, ASSIGNORS TO THEMSELVES AND E. R. CHENEY, OF SAME PLACE.

Letters Patent No. 92,236, dated July 6, 1869.

IMPROVEMENT IN RUBBER SPRINGS.

The Schedule referred to in these Letters Patent and making part of the same.

*To all whom it may concern:*

Be it known that we, GEORGE WEAVER and H. NELSON ALLEN, both of Boston, in the State of Massachusetts, have invented a new and useful Improvement in Rubber Springs for Valves and other purposes; and we do hereby declare the following to be a full, clear, and exact description of the same.

The nature of our improvement consists in forming rubber springs hollow, in such a manner as to increase the elasticity, and at the same time cause them to fit more securely the objects upon which they are to be used.

We subjoin the further description of our invention, to enable those skilled in the art to manufacture and use the same, reference being had to the accompanying drawings, in which—

Figure 1:
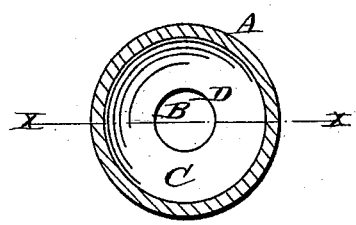
Figure 2:
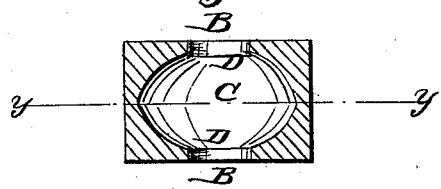

Figure 1 represents a section of our improved rubber spring on the line $y-y$, fig. 2, and Figure 2 shows a section of the same on the line $x-x$, fig. 1.

A represents a rubber spring.

B B shows a hole extending through the spring.

Instead of the hole B extending through in a direct line, forming the inner surface of a cylinder, it enlarges equally in all directions from near the surface until it reaches the centre, where it commences to contract till it reaches near the opposite side, forming a continuous groove on the inner surface, as shown in the drawings, figs. 1 and 2, thus making the spring hollow, as described.

The advantages gained by thus constructing the spring are obvious. The groove or hollow in it permits of its being slipped upon a knob or head which is received in the hollow or groove C, while the edges D, being smaller in circumference than the centre of the spring, cause them to draw tight, and hold firmly upon either side of the knob or head, thus preventing the spring slipping. This spring may be applied to any use to which ordinary springs are applicable, and is not to be confined to knobs or heads.

It is especially adapted for valves of all kinds, and pistons, and the seats of ball-valves, for the reasons stated, viz, the perfect manner in which it fits the object to which it is applied, and the increased elasticity obtained by hollowing it, as set forth.

Having thus described our invention,

What we claim as new, and for which we desire to secure Letters Patent, is—

The hollow rubber-spring or packing A, constructed with a cylindrical exterior, one or more apertures, B, and an internal cavity, C, increasing in diameter from the ends toward the centre, substantially as and for the purpose described.

GEORGE WEAVER.
H. NELSON ALLEN.

Witnesses:
ETHAN R. CHENEY,
WILLARD LANE.